W. H. BRUNING.
COFFEE POT.
APPLICATION FILED MAY 31, 1918.

1,351,410.

Patented Aug. 31, 1920.
2 SHEETS—SHEET 1.

WITNESSES

INVENTOR
William H. Bruning
BY
ATTORNEYS

W. H. BRUNING.
COFFEE POT.
APPLICATION FILED MAY 31, 1918.

1,351,410.

Patented Aug. 31, 1920.
2 SHEETS—SHEET 2.

WITNESSES

INVENTOR
William H. Bruning
BY
ATTORNEYS

UNITED STATES PATENT OFFICE.

WILLIAM H. BRUNING, OF EVANSVILLE, INDIANA.

COFFEE-POT.

1,351,410.

Specification of Letters Patent. Patented Aug. 31, 1920.

Application filed May 31, 1918. Serial No. 237,451.

*To all whom it may concern:*

Be it known that I, WILLIAM H. BRUNING, a citizen of the United States, and a resident of Evansville, in the county of Vanderburg and State of Indiana, have invented a new and Improved Coffee-Pot, of which the following is a full, clear, and exact description.

Among the principal objects which the present invention has in view are: to avoid radiation of heat during the process of making coffee, and of radiation of heat from the coffee subsequent to the making thereof; to avoid insanitary conditions in the coffee-making utensil; to distribute water poured over the prepared coffee; to equalize the filtration thereof; to more thoroughly filter the coffee before deposit in the liquid-containing chamber of the coffee pot; to provide means for maintaining by diffusion the heat of the liquid coffee; to avoid loss of the heat-sustaining medium from the coffee pot when the same is in service; and to construct a coffee pot of the character mentioned arranged to afford easy access for the purpose of cleansing.

Drawings.

Figure 1:
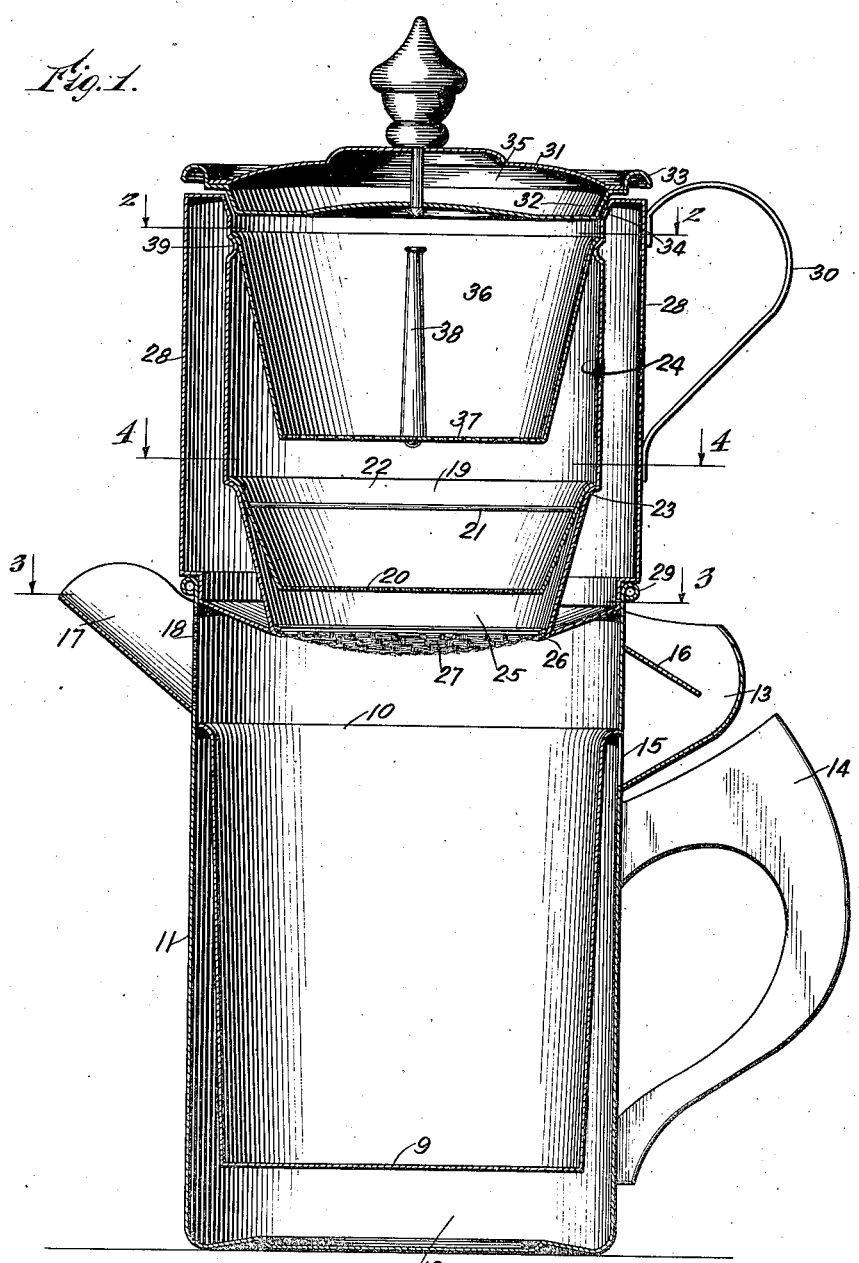
Figure 1 is a vertical section of a coffee pot constructed and arranged in accordance with the present invention, the section being taken as on the line 1—1 in Fig. 2.
Figure 2:
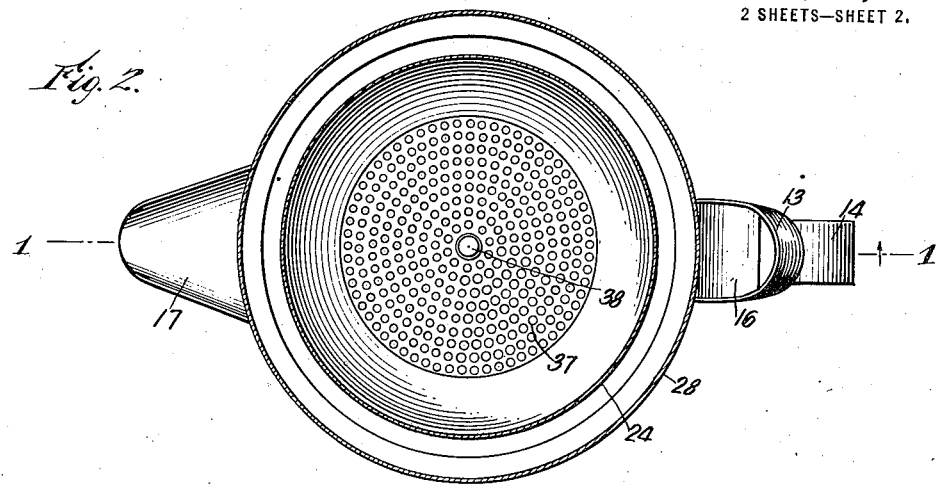
Fig. 2 is a horizontal plan section, the section being taken as on the line 2—2 in Fig. 1.
Figure 3:
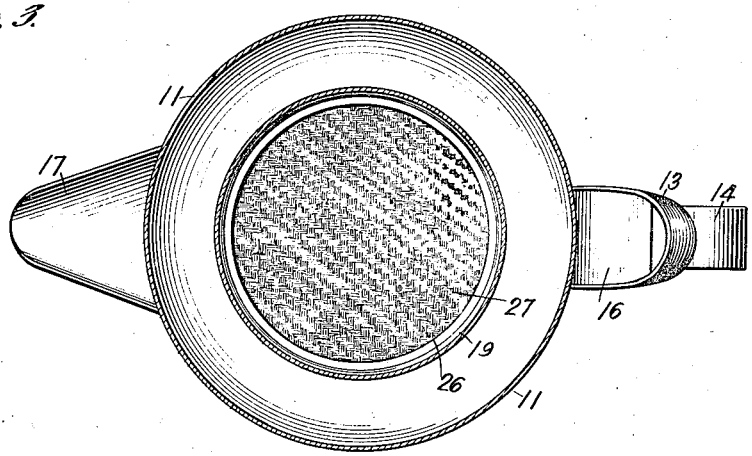
Fig. 3 is a horizontal plan section, the section being taken as on the line 3—3 in Fig. 1.
Figure 4:
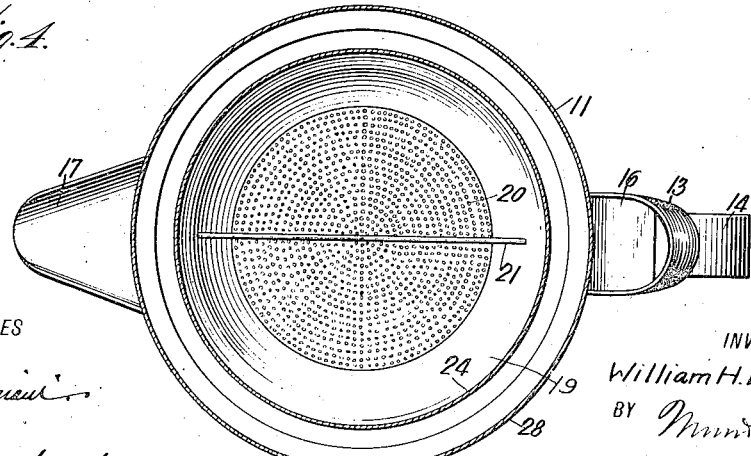
Fig. 4 is a plan section, the section being taken as on the line 4—4 in Fig. 1.

Description.

The utensil herein disclosed relates principally to the class of coffee pots used for making what is known in the art as "drip coffee", or coffee produced by pouring boiling water or other liquid over the body of ground coffee suspended above the repository for the liquid coffee, and wherein arrangements are made for more or less successfully preventing the bean particles or "grounds" being carried over to the liquid coffee.

In the present invention, a liquid coffee or extract container 9 is provided, the container being downwardly tapered, and at the upper edge thereof having a laterally extended flange 10, which flange is structurally connected with the outer wall 11 of the coffee pot. As a result of this construction, there is formed between the outer wall 11 and the tapered wall of the container 9, a surrounding space in open communication with the space 12, separating the bottom of the outer wall of the coffee pot and the bottom of the container 9. The space between the two bottoms and between the side walls above mentioned, is intended to receive heated water or other liquid provided to prevent the radiation of heat from the body of the liquid placed in the container 9. The water thus introduced between the container 9 and the outer wall 11, is introduced through a receiving spout 13, preferably disposed in juxtaposed relation to and above the handle 14, by which the pot is manipulated in service. The receiving spout 13 communicates with the space between the wall 11 and the container 9, by an opening 15. The upper edge of the opening 15 is coincident with the under surface of the flange 10, thereby avoiding the trapping of air between the two walls and also affording an easy and convenient method of flushing or cleaning the space between the container 9 and wall 11.

To prevent overflowing of the water thus deposited in the space 12, a retainer plate 16 is mounted in the spout 13 to extend across the same to near the outer extension thereof. It is obvious that when the pot is turned to deliver the liquid coffee or extract through the perforations 18 of the spout 17, the heated water which is usually supplied to the space 12 is prevented from overflowing from the spout 13 by the interposition of the plate 16. To further safeguard the spout 13 from overflowing, the coffee liquid container is made tapering downward, so that the contents can be poured from the spout 17 with less inclination than from a straight container.

To produce the liquid coffee or extract which is deposited in the container 9, a dripper body is provided. The dripper body herein disclosed has a pan 19, provided to hold the ground coffee, the essence of which is to be leeched by heated water being passed therethrough. A sieve bottom 20 is provided for the pan, as well as a bar 21 for handling the pan. The upper edge 22 of the pan is outwardly spun to form a suspension member for said pan when the same is deposited on the ledge 23. The ledge 23 forms an annular junction for the straight inner wall 24 of the dripper body and the inner wall of the well 25. The bottom of the well 25 is closed with a wire or perforated bottom, and has an inturned flange 26 for supporting the auxiliary close-mesh wire screen 27, which is made removable to facilitate the cleansing thereof. The screen 27 is constructed of wire, the mesh of which is very fine, it being intended that this screen will arrest the smaller particle or flocculent substance which may be carried over with the filtration from the pan 19 and the bottom 20 thereof, or any other device may be adapted, whereon the coffee may be placed above the auxiliary screen 27.

The dripper body is removably disposed on the pot and the outer wall 11 thereof. To this end, the lower edge of the outer wall 28 of the dripper body is recessed to form an annular rabbet to rest on the curled edge 29 of the wall 11. A handle 30 is furnished whereby the dripper body is manipulated independently of the pot, when it becomes desirable to lift the dripper body from the said pot as when disposing the pot in service. The inner chamber of the dripper body and the pot are both closed in service by a cover 31.

As shown in Fig. 1, of the drawings, the cover 31 has a tapered wall 32 and a curved wall 33, which engage, respectively, the tapered edge 34 of the dripper body and the curled edge 29 of the pot body, to form an air tight seal to regulate or retard the speed of the dripping at will. A dead air space 35 is formed in the cover 31, which retards or prevents the radiation of heat from the chamber closed by the said cover.

Directly above the pan 19, is a water or fluid receptacle 36. The receptacle 36 has a sieve-like spreading bottom 37 and a stem-like handle 38 by which the receptacle 36 is adjusted upon and removed from the ridge 39 formed in the wall 24 to support said receptacle 36 in service.

When using a coffee pot constructed and arranged in accordance with the present invention, the pan 19 is suitably packed with ground coffee or composition composed therefrom. The pan is then placed in position within the well 25, which well has been previously equipped with the screen 27. The receptacle 36 is next placed in position and the dripper body is then placed in service relation to the coffee pot. The cover 31 being removed, boiling water is poured into the receptacle 36, the screen bottom operating to distribute the water over the full surface of the coffee held in the pan 19, which is thus prevented from being mechanically disturbed or washed away. The desired amount of water having been poured into the receptacle 36, the cover 31 is disposed on the dripper body.

Filtration now ensues, the water from the receptacle 36 and the inner chamber of the dripper body seeping through the body of the coffee held in the pan 19, extracting the essence therefrom. The liquid having passed through the body of the coffee and the screen bottom 20, is passed through the screen 27, the meshes whereof arresting any lighter particles of coffee which may have been carried over. The clear filtrate is deposited in the container 9.

To avoid radiation of heat from the filtrate, boiling water is poured into the chamber 12, through the receiving spout 13 until the boiling water rises to the level of the flange 10. If it is desired to strengthen the coffee, the operation of re-passing the filtrate through the receptacle 36 and the body of the coffee in the pan 19, may be employed.

During the operation of dripping the coffee, the liquid in the dripper body is prevented from radiating its heat by the insulation of the dead air space between the inner wall 24 and the outer wall 28, and of the dead air space 35 in the cover 31.

While in the present disclosure, the walls 24 and 28 are shown as forming a dead air space therebetween, it will be understood that should it be desired, the common expedient employed in heat insulation, to wit, the packing of the space with a heat-insulating material, may be here exercised.

*Claims.*

1. In a coffee pot, a dripper adapted to be superposed on a coffee pot, said dripper having spaced concentric walls forming an air space, the outer wall having an external shoulder, and the inner wall having a reduced lower portion provided with a removable filtering screen at its bottom and a coffee receptacle having a sieve bottom and arranged in the inner wall with its bottom above the filtering screen thereof.

2. In a coffee pot, a dripper adapted to be superposed upon a coffee pot, said dripper having spaced concentric walls forming an air space, the outer wall having an external shoulder and the inner wall having a reduced and tapering lower portion provided with a removable filtering screen at its lower end, and a coffee receptacle having a sieve bottom and removably held in the reduced portion of the inner wall with its bottom above the filtering screen of said wall.

3. In a coffee pot, a dripper adapted to be superposed on a coffee pot, said dripper having spaced concentric walls forming an annular air space, the inner wall having a reduced power portion, a removable filtering screen at the bottom of the reduced portion of the inner wall, a coffee receptacle having a sieve bottom and held in the reduced portion of the inner wall with its bottom above the filtering screen, and a water receptacle having a perforated bottom and arranged in the upper portion of the inner wall above the coffee receptacle.

4. In a coffee pot, a dripper adapted to be superposed upon a coffee pot, said dripper having spaced concentric walls forming an annular air space, the inner wall having a reduced and tapering lower portion, a filtering screen at the bottom of the reduced lower portion of the inner wall, a coffee receptacle having a sieve bottom and arranged in the reduced portion of the inner wall with its bottom above the filtering screen, a water receptacle having a perforated bottom and arranged on the upper part of the inner wall, and a cover formed with an air space and fitting tightly on the dripper body.

5. In a coffee pot, a dripper body adapted to be superposed on a coffee pot, said dripper body having concentric spaced walls forming an annular dead air space, the upper end of the inner wall being tapered, and a cover formed with an air space and having a tapered wall engaging the tapered edge of the inner wall of the dripper body.

6. A coffee pot comprising a dripper body, a receptacle for containing liquid delivered from said dripper body, and a cover for said dripper body and said receptacle, said dripper body having a tapered seat and said receptacle having a rolled ledge, and said cover having a tapered portion adapted to fit said tapered seat of the dripper body, and a curved portion adapted to fit said ledge.

7. A coffee pot for making drip or percolated coffee, comprising a receptacle having oppositely arranged outlet and inlet spouts, the inlet spout having a retaining plate extending partly across the same, a tapering extract container suspended in the receptacle below the outlet spout and forming with the receptacle a water space, with which the inlet spout communicates, and a percolating device, comprising a well having a jacket resting upon the receptacle and forming with the well a dead air space, said well being provided with a screen bottom, a cover for the well, a coffee container in the well above the bottom thereof and having a sieve bottom, and a water container in the well above the coffee container and having a sieve bottom.

8. In a jacketed coffee serving pot for dining table use, a body having within the same a percolator or filtering device including a coffee container having a sieve like bottom and a removable disk filtering screen, said body being provided with a discharge spout on the outside and a permanently open inlet spout, and an extract container suspended in the body below the discharge spout and forming a water space with the body, the spouts being oppositely arranged and the inlet spout being arranged at the outside and opening into the body immediately below the top of the extract container to prevent the trapping of air between the body and container, said inlet spout also opening into the water space and being provided with a retaining plate extending partly across the same above said opening to prevent the water in the jacket from escaping when the pot is inclined in pouring out the coffee.

9. A coffee pot comprising a dripper body, a receptacle for containing liquid delivered from said dripper body, a body receiving said receptacle and having a receiving spout, a cover for said dripper body and said receptacle, said cover having a double wall providing a heat insulating space to prevent the radiation of heat therethrough, and having a tapered seat-engaging portion and a concaved edge portion outwardly thereof, said dripper body having a tapered seat for engagement by said cover and said receptacle having a curled edge for engagement by the curved portion of the cover whereby said cover is adapted to fit both said receptacle and body, said body having a heat insulating wall structure, and means for preventing the overflow from said receiving spout when manipulating the coffee pot as in service, said means embodying a retainer plate extending partially across said receiving spout interrupting the passage between the receiving and delivering ends of said spout.

10. A coffee pot comprising a body having a discharge spout and an inlet spout opposite the discharge spout, an extract retainer suspended in the body below the discharge spout and forming with the body a space for hot water and into which space opens the inlet spout, and a dripper supported upon the body, said dripper having concentric and spaced walls and provided with a filtering screen at its bottom end with a cover, said dripper containing a coffee receptacle having a sieve bottom and a water receptacle having a perforated bottom.

11. A coffee pot for making drip or percolated coffee comprising a receptacle having within the same a percolator or filtering device including a coffee container having a sieve like bottom and a removable disk filtering screen, said body being provided with a pouring spout and a receiving spout, an extract container supported in said receptacle below said pouring spout and having a laterally extending flange at its upper edge connected to said receptacle, said container tapering toward its bottom and having its peripheral wall spaced from the peripheral wall of the receptacle to provide an annular surrounding water space and having its bottom spaced from the bottom of the receptacle in continuation of the water space, said receptacle having an opening wholly between the flange of the container and at the bottom of the receiving spout, and means for preventing the overflow from said receiving spout when manipulating the coffee pot as when in service, and comprising an outwardly and downwardly inclined retaining plate extending from the receptacle near the top of the receiving spout.

12. A coffee pot for making drip coffee, comprising a receptacle having a pouring spout and a receiving spout, an extract container supported in said receptacle below said pouring spout and having a laterally extending flange at its upper edge connected to said receptacle, said container tapering toward its bottom and having its peripheral wall spaced from the peripheral wall of the receptacle to provide an annular surrounding water space and having its bottom spaced from the bottom of the receptacle in continuation of the water space, a dripper body comprising a double walled structure having a rabbet to engage the ledge of the receptacle, said double wall providing a heat insulating space, the inner wall producing an inner space of less diameter than the container, a water receptacle removably supported in the upper portion of said dripper body within said inner wall and having a sieve-like bottom, a prepared coffee container supported within said body and wall below said water receptacle and having a sieve-like bottom, a screen in the bottom of said body and wall below said prepared coffee container, and a cover adapted to fit said receptacle or dripper body and comprising a double walled structure forming a heat insulating space between the walls thereof.

WILLIAM H. BRUNING.